Dec. 28, 1965  A. S. OLEXSON ET AL  3,225,451
PIGGYBACK POCKET LEVEL
Filed Feb. 18, 1963  3 Sheets-Sheet 1
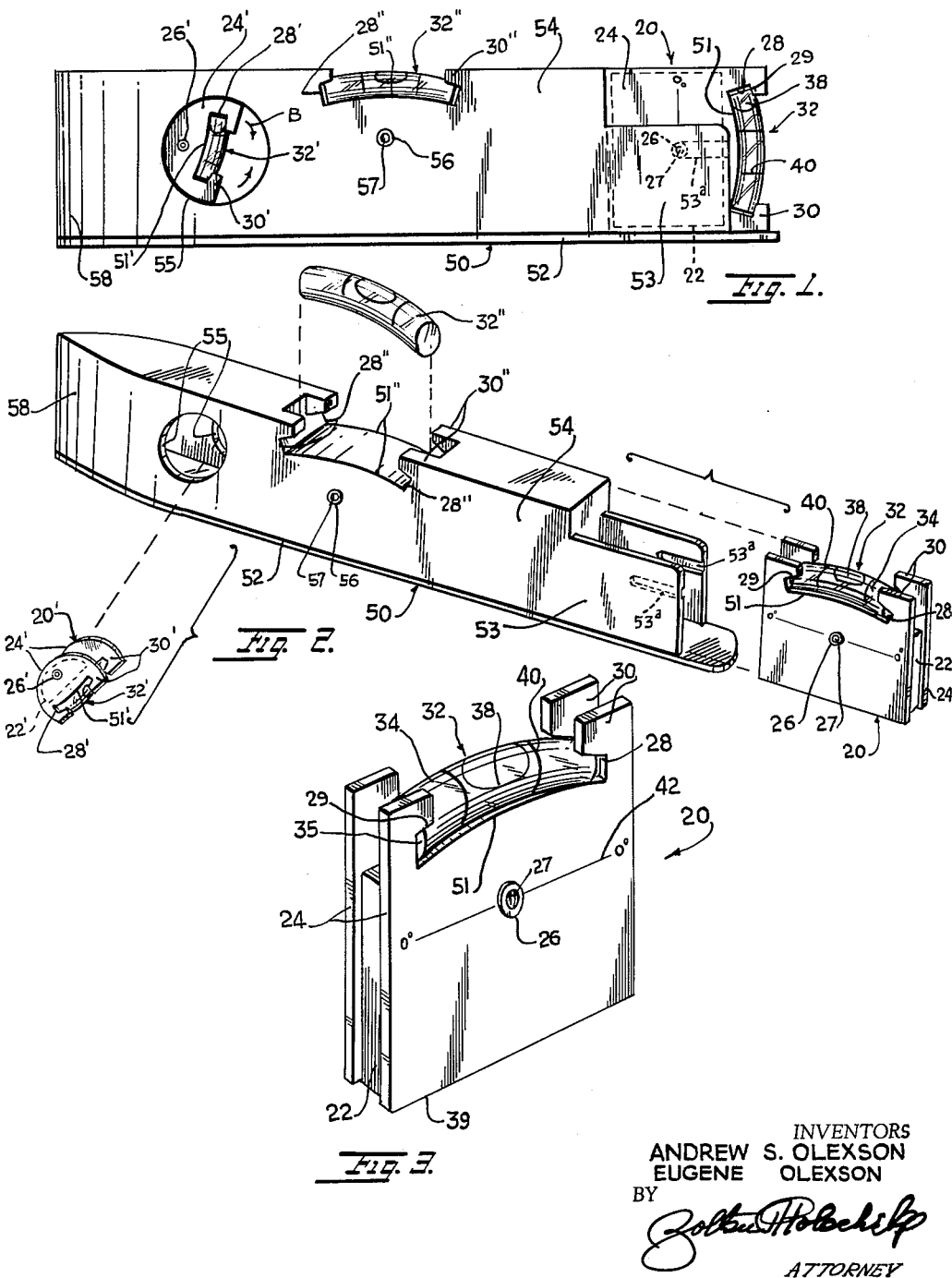
INVENTORS
ANDREW S. OLEXSON
EUGENE OLEXSON
BY
ATTORNEY Dec. 28, 1965   A. S. OLEXSON ET AL   3,225,451
PIGGYBACK POCKET LEVEL
Filed Feb. 18, 1963   3 Sheets-Sheet 2
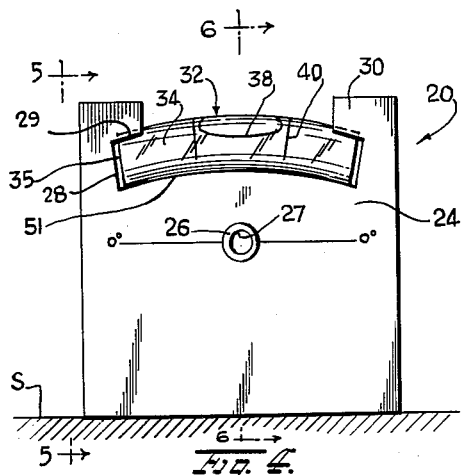
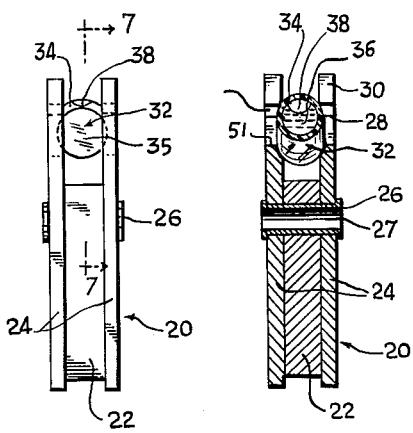
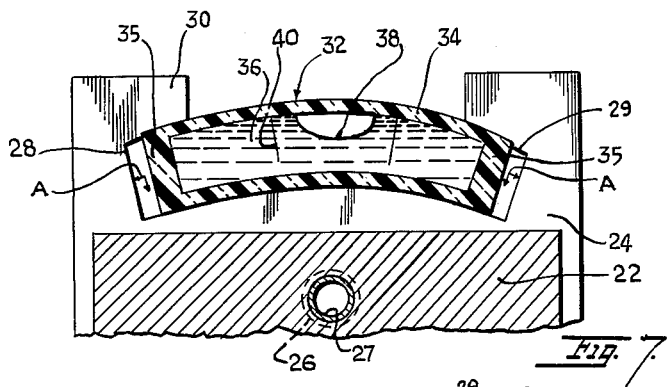
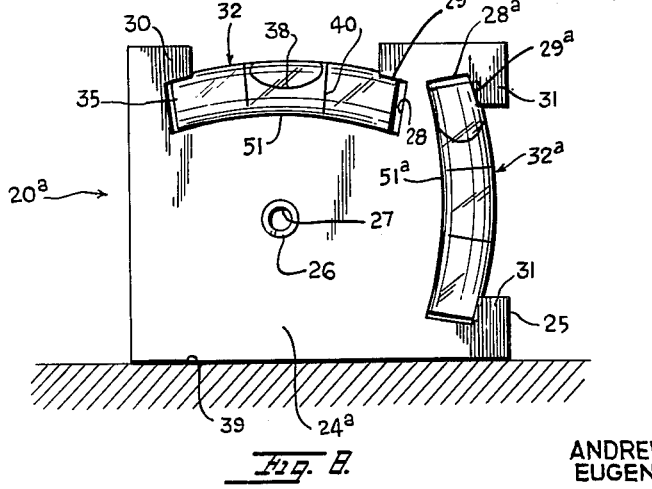
INVENTORS
ANDREW S. OLEXSON
EUGENE OLEXSON
BY
ATTORNEY Dec. 28, 1965 A. S. OLEXSON ET AL 3,225,451
PIGGYBACK POCKET LEVEL
Filed Feb. 18, 1963 3 Sheets-Sheet 3
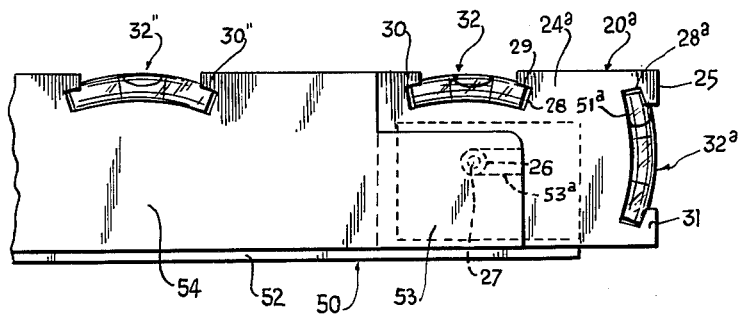
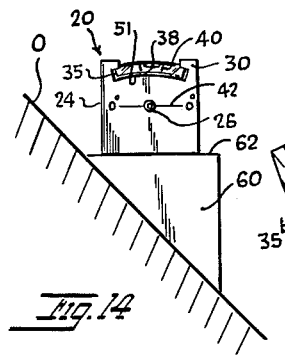
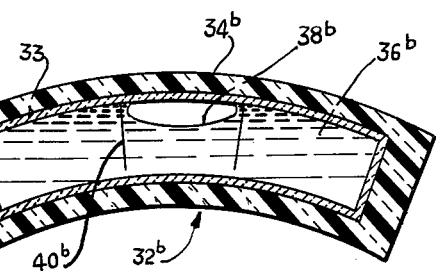
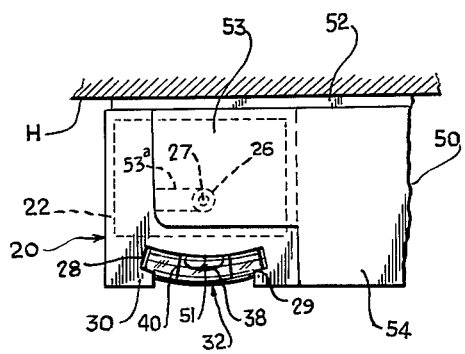
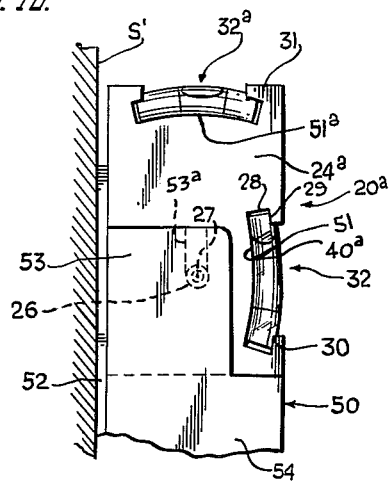
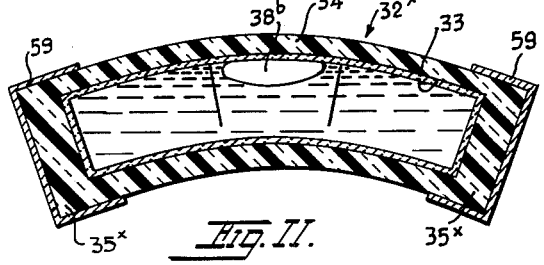
INVENTOR.
ANDREW S. OLEXSON
EUGENE OLEXSON
BY
ATTORNEY

United States Patent Office 3,225,451
Patented Dec. 28, 1965

3,225,451
PIGGYBACK POCKET LEVEL
Andrew S. Olexson, Lebanon, N.J. (Bloomsbury, N.J.), and Eugene P. Olexson, Roselle, N.J. (Mine Road, Box 186B, Asbury, N.J.)
Filed Feb. 18, 1963, Ser. No. 261,555
17 Claims. (Cl. 33—207)

This invention relates to leveling devices or instruments and more particularly concerns a magnetic level and holder therefor.

According to the invention there is provided a leveling device including a magnetized body with a pair of flat, rectangular pole pieces. One or more spirit levels are adjustably mounted between the pole pieces. The levels have arcuate, hollow cylindrical bodies with flexible ends which permit adjustable positioning of the levels between the pole pieces. The holder is an elongated casing adapted to support level devices at its end and top edge. In addition, a further level device can be rotatably positioned in its side.

It is therefore a principal object of the invention to provide a spirit level and plumbing device which has a magnetized body for removably mounting the device on a metal magnetic member to be leveled or plumbed.

A further object is to provide a spirit level device with a magnetized body, rectangular pole pieces, and at least one arcuate, tubular spirit level with a plastic resilient casing adjustably supported between the pole pieces.

Another object is to provide a spirit level assembly including an elongated casing having a plurality of spirit level devices mounted thereon, each of the spirit levels including an adjustable axially arcuate, tubular, resilient casing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a leveling assembly embodying the invention.

FIG. 2 is an exploded perspective view of parts of the assembly of FIG. 1.

FIG. 3 is a perspective view on an enlarged scale of a spirit leveling device according to the invention.

FIG. 4 is a side elevational view of the device of FIG. 3.

FIG. 5 and FIG. 6 are end and sectional views, respectively, taken on lines 5—5 and 6—6 of FIG. 4.

FIG. 7 is a fragmentary sectional view on a further enlarged scale taken on line 7—7 of FIG. 5.

FIG. 8 is a side elevational view of another spirit leveling device.

FIG. 9 is a side elevational view of part of a leveling assembly including the leveling device of FIG. 8.

FIG. 10 is a central sectional view through a modified form of spirit level.

FIG. 11 is an enlarged longitudinal vertical section through another modified form of spirit level.

FIG. 12 is a side elevational view of a leveling assembly.

FIG. 13 is a side elevational view of another modified form of leveling assembly in operative position.

FIG. 14 is a view partly diagrammatic and partly elevational showing a modified form of leveling assembly in use on an oblique surface.

Referring first to FIGS. 1–7, there is shown a leveling device 20 embodying one form of the invention. This device has a flat rectangular plate magnet 22. The plate magnet is permanently magnetized. This plate magnet may be a solid body of ferrous metal or alnico, or may be plate of powdered metal or of plastic material containing powdered magnetic material. On opposite sides of plate magnet 22 are two rectangular metal plates 24 secured together by a rivet 26 passing through plate magnet 22 and metal plates 24. The plate magnet 22 is spaced from the edges of plates 24 which serve as pole pieces for the magnet.

In one edge of each of plates 24 is formed a generally inverted T-shaped cutout 28. Two inverted L-shaped tabs 30 are formed in each plate. The tabs of one plate 24 are spaced from and parallel to the tabs of the other plate. The base of each cutout 28 is curved or arcuate in shape as indicated at 51.

Adjustably mounted between the tabs is a spirit level 32. This level includes a plastic tube 34 with thick, somewhat resilient ends 35. The tube is curved or arcuate along its length or axis and is substantially filled with alcohol, oil or other fluid 36. The tube is incompletely filled leaving an air bubble 38 which normally centers at the upper convex side of the tube between index lines 40 on the tube.

The body and ends of the tube are adjustable axially and radially of the tube as indicated by arrows A in FIG. 7 to orient the level 32 so that bubble 38 will be exactly centered between lines 40 when the opposite edge 39 of the level device is horizontal. The bubble 38 will also be centered between the lines 40 at the concave side of the tube when the level device 20 is inverted as indicated in FIG. 12 and supported on a horizontal surface H.

A protractor or angular scale 42 may be engraved on the sides of the leveling device, with the lines of the scale radiating outwardly from rivet 26. The rivet has a central opening 27 which can receive a string of a plumb bob for use of the level as a plumbing device.

In FIGS. 1 and 2 is shown a holder 50 forming part of a leveling assembly with leveling device 20. The holder has a rectangular body including side walls 54. This holder has a flat, elongated bottom plate 52 made of permanent magnetic material such as iron or steel. The side walls 54 of the holder may be made of aluminum or other nonmagnetic metal or material. The leveling device 20 is removably held on one end of the holder, the back end as viewed in FIG. 1, in piggyback fashion, by magnetic attraction to plate 52. The device 20 will be disposed between end extensions 53 of side walls 54 which are cut away to expose the spirit level 32. The device 20 can be grasped, pulled outwardly and detached for use independently of the holder 50. The device 20 is guided in its movements by the rivets 26 riding in grooves 53ᵃ in extensions 53.

In the side walls 54 of the holder there are aligned holes 55 which receive a leveling device 20'. Device 20' has arcuate side plates 24' between which is a plate magnet 22' held by rivet 26'. The side plates 24' have T-shaped cutouts 28' with tabs 30'. A spirit level 32' is adjustably disposed between the plates 24' at tabs 30'. The device 20' can be frictionally fitted in the holes 55 and rotatably disposed as indicated by arrows B in FIG. 1, so that the assembly can be used for leveling an object at any desired angle to the horizontal or vertical.

In the upper end of the body of the holder 50 there is an inverted T-shaped cutout 28" defining tabs 30" and adjustably supporting another spirit level 32". The base of the cutout is arcuate as indicated at 51". A rivet 56 just below the cutout 28" provides a hole 57 for receiving the string of a plumb bob. The rivet also serves to reinforce the structure of the holder. The holder has a closed, tapered end 58 opposite the open end at which device 20 is mounted.

FIG. 4 shows the device 20 disposed on a horizontal surface S. The bubble 38 is shown centered between lines 40 on spirit level 32.

FIGS. 8 and 9 show a modified form of leveling device 20a which is similar to leveling device 20 except that further inverted T-shaped cutouts 28a are formed in lateral edges 25 of the side plates 24a. Another spirit level 32a is disposed longitudinally perpendicular to the level 32 between tabs 31 on the arcuate bases 51a.

FIG. 13 shows how the device 20a can be used to determine the plumbness of a vertical surface S'. The bubble 38a in level 32 will be centered between lines 40a if the surface S' is truly vertical. The device 20a is shown mounted in the back end of holder 50, but it may be used alone without the holder if a short length of surface S' is to be tested for plumbness.

FIG. 10 shows a modified form of spirit level 32b. The level 32b includes a transparent sealed glass tube 33 enclosed within a resilient, transparent plastic jacket 34b, with resilient ends 35b. The tube 33 is filled with liquid 36b except for air bubble 38b. The tube and jacket are axially or longitudinally arcuate and the glass tube or jacket is marked with spaced bubble centering lines 40b. This level can replace any of the transparent plastic spirit levels 32, 32a, 32' and 32".

In FIG. 11, still another modified form of spirit level 32x is shown, differing only from the level 32b of FIG. 10 in that metal caps 59 are snapped over the resilient ends 35x of the plastic jacket 34x. These caps reinforce the ends.

In FIG. 12, the leveling device 20 is shown in position to determine the plumbness of an overhead horizontal surface H. It will be noted that the bubble 38 appears on the concave side of the spirit level 32.

FIG. 14 illustrates the use of the leveling device 20 for measuring the plumbness of an oblique surface 0. When so used, a block 60 triangular in cross section is used as an adapter to provide a horizontal supporting surface 62 for the device.

It should be noted that a particular feature of the invention is the provision of inverted L-shaped tabs in the pole plates of the several level devices and side walls 54 of the holder 50. The base of one leg of each tab is curved as indicated at 29 to conform to the curved end of the adjacent spirit level. These tabs serve as jaws to grip the thick resilient ends 35, 35' or 35b of the spirit levels and prevent their working loose after they are adjustably positioned. The long arcuate bottom edges or bases 51, 51a, 51', 51" of the cutouts 28, 28a, 28', 28" cooperate with the tabs to hold the spirit levels in adjusted positions.

A further feature of the invention is that the leveling devices 20, 20' and 20a can be used to test horizontal, vertical and obliquely disposed surfaces either alone or in conjunction with the holder 50 and adapter block 60.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, a tubular spirit level engaged in the cutouts of the plates between the tabs and the long bottom edges of the cutouts, said tubular level having a hollow longitudinally arcuate body with resilient ends adjustably engaged by the tabs and arcuate bottom edges of the cutouts, and a fluid incompletely filling said body to provide an air bubble movable in said body.

2. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, a rivet securing the plates and magnet together, said magnet being spaced from edges of the plates so that the plates serve as pole pieces for the magnet, and a tubular spirit level disposed in the cutouts of the plates between the tabs and the long arcuate bottom edges of the cutouts.

3. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, a rivet securing the plates and magnet together, said magnet being spaced from edges of the plates so that the plates serve as pole pieces for the magnet, a tubular spirit level disposed in the cutouts of the plates between the tabs and the long arcuate bottom edges of the cutouts, said tubular level having a hollow longitudinally arcuate body with resilient ends adjustably engaged by the tabs and bottom edges of the cutouts, and a fluid incompletely filling said body to provide an air bubble movable in said body.

4. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, a rivet securing the plates and magnet together, said magnet being spaced from edges of the plates so that the plates serve as pole pieces for the magnet, a tubular spirit level disposed in the cutouts of the plates between the tabs and the long arcuate bottom edges of the cutouts, said tubular level having a hollow longitudinally arcuate glass body, a transparent plastic jacket enclosing said body, said jacket having thick resilient ends adjustably engaged by the tabs and bottom edges of the cutouts, and a liquid incompletely filling said body to provide an air bubble movable in said body.

5. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, another inverted T-shaped cutout at another edge of each plate perpendicular to said one edge and defining a long lateral edge with a pair of other overhanging opposed inverted L-shaped tabs, and a pair of tubular spirit levels respectively disposed in the cutouts of the adjacent edges of the plates between the tabs and long arcuate edges of the cutouts.

6. A leveling device, comprising a pair of flat rectangular plates made of magnetic material, a flat rectangular permanent magnet disposed between the pair of plates, each of said plates having an inverted T-shaped cutout at one edge defining a long bottom arcuate edge and a pair of overhanging opposed inverted L-shaped tabs, another inverted T-shaped cutout at another edge of each plate perpendicular to said one edge and defining a long arcuate lateral edge with a pair of other overhanging opposed inverted L-shaped tabs, and a pair of tubular spirit levels respectively disposed in the cutouts of the adjacent edges of the plates between the tabs and long arcuate edges of the cutouts, a rivet securing the plates and magnet together, said magnet being spaced from the edges of the plates so that the plates serve as pole pieces for the magnet.

7. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, another inverted T-shaped cutout at another edge of each plate perpendicular to said one edge and defining a long lateral arcuate edge with a pair of other overhanging opposed inverted L-shaped tabs, and a pair of tubular spirit levels respectively disposed in the cutouts of the adjacent edges of the plates between the tabs and long arcuate edges of the cutouts, a rivet securing the plates and magnet together, said magnet being spaced from the edges of the plates so that the plates serve as pole pieces for the magnet, each of said levels having a hollow longitudinally arcuate body with resilient ends adjustably engaged by the tabs and arcuate bottom edges of the cutouts, and a fluid incompletely filling said body to provide an air bubble movable in said body.

8. A leveling device, comprising a pair of flat rectangular plates made of magnetic material, a flat rectangular permanent magnet disposed between the pair of plates, each of said plates having an inverted T-shaped cutout at one edge defining a long arcuate bottom edge and a pair of overhanging opposed inverted L-shaped tabs, another inverted T-shaped cutout at another edge of each plate perpendicular to said one edge and defining a long arcuate lateral edge with a pair of other overhanging opposed inverted L-shaped tabs, a pair of tubular spirit levels respectively disposed in the cutouts of the adjacent edges of the plates between the tabs and long arcuate edges of the cutouts, a rivet securing the plates and magnet together, said magnet being spaced from the edges of the plates so that the plates serve as a pole pieces for the magnet, each of said levels having a hollow longitudinally arcuate glass body, a transparent plastic jacket enclosing said body, said jacket having thick resilient ends adjustably engaged by the tabs and bottom edges of the cutouts, and a liquid incompletely filling said body to provide an air bubble movable in said body.

9. A leveling assembly, comprising an elongated, rectangular, hollow casing formed by two opposing side walls made of nonmagnetic material, and a long flat bottom wall formed of permanent magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed inverted L-shaped tabs, and a tubular spirit level engaged in the cutouts of the plates between the tabs and the arcuate long edges of the cutouts.

10. A leveling assembly, comprising an elongated, rectangular hollow casing formed by two opposing side walls made of nonmagnetic material, and a long flat bottom wall formed of magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed inverted L-shaped tabs, a tubular spirit level engaged in the cutouts of the plates between the tabs and the long edges of the cutouts, each of said plates having another edge perpendicular to said one edge formed with another inverted T-shaped cutout to define a long arcuate lateral edge and overhanging other opposed inverted L-shaped tabs, and another tubular spirit level engaged in the other cutouts of the plates between said other tabs and the arcuate lateral edges thereof.

11. A leveling assembly, comprising an elongated, hollow casing formed by two opposing side walls made of nonmagnetic material, and a long flat bottom wall formed of permanent magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed inverted L-shaped tabs, a tubular spirit level engaged in the cutouts of the plates between the tabs and the long edges of the cutouts, each of said plates having another edge perpendicular to said one edge formed with another inverted T-shaped cutout to define a long arcuate lateral edge and overhanging other opposed inverted L-shaped tabs, another tubular spirit level engaged in the other cutouts of the plates between said other tabs and the lateral edges thereof, each of said levels having a hollow longitudinally arcuate body with resilient ends adjustably engaged by the tabs and bottom edges of the cutouts, and a fluid incompletely filling said body to provide an air bubble movable in said body.

12. A leveling assembly, comprising an elongated, rectangular hollow casing formed by two opposing side walls made of nonmagnetic material, and a long flat bottom wall formed of magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed arcuate L-shaped tabs, and a tubular spirit level engaged in the cutouts of the plates between the tabs and the long edges of the cutouts, said side walls having aligned holes therein, and another spirit level rotatably disposed in said aligned holes.

13. A leveling assembly, comprising an elongated, rectangular hollow casing formed by two opposing side walls made of nonmagnetic material, and a long flat bottom wall formed of magnetic material, one end of each wall having a cut-away portion defining a recess with said bottom wall, a level structure detachably disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed inverted L-shaped tabs, a tubular spirit level engaged in the cutouts of the plates between the tabs and the long edges of the cutouts, said side walls having aligned holes therein, another spirit level rotatably disposed in said aligned holes, said casing having a top wall with a cut-away portion including further inverted T-shaped cutouts formed in the side walls, said cutouts having opposing top edges and overhanging further tabs, and another spirit level adjustably disposed between said further tabs and said top edges of the side walls.

14. A leveling assembly, comprising an elongated, rectangular hollow casing formed by two opposing side walls made of nonmagnetic material, and a long flat bottom wall formed of magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said plates and spaced from edges thereof so that the flat plates serve as pole pieces, said structure being removably held on said flat bottom wall by magnetic attraction of said magnet, each of said plates having an inverted T-shaped cutout at one edge defining a long arcuate bottom edge and a pair of overhanging opposed inverted L-shaped tabs, a tubular spirit level engaged in the cutouts of the plates between the tabs and the arcuate long edges of the cutouts, said side walls having aligned holes therein, another spirit level rotatably disposed in said aligned holes, said casing having a top wall with a cut-away portion including further inverted T-shaped cutouts formed in the side walls, said cutouts having opposing top edges and overhanging further tabs, another spirit level adjustably disposed between said further tabs and said top edges of the side walls, each of said levels having a hollow longitudinally arcuate body with resilient ends adjustably engaged by the tabs and arcuate bottom edges of the cutouts, and a fluid incompletely filling said body to provide an air bubble movable in said body.

15. A leveling assembly, comprising an elongated, rectangular hollow casing formed by two opposing side walls made of nonmagnetic material, and a long flat bottom wall formed of magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long bottom arcuate edge and a pair of overhanging opposed arcuate L-shaped tabs, a tubular spirit level engaged in the cutouts of the plates between the tabs and the long edges of the cutouts, each of said plates having another edge perpendicular to said one edge formed with another inverted T-shaped cutout to define a long lateral edge and overhanging other opposed inverted L-shaped tabs, another tubular spirit level engaged in the other cutouts of the plates between said other tabs and the lateral edges thereof, said side walls having aligned holes therein, another spirit level rotatably disposed in the aligned holes, said casing having a top wall with a cut-away portion including further inverted T-shaped cutouts formed in the side walls, said cutouts having opposing top edges and overhanging further tabs, and another spirit level adjustably disposed between said further tabs and said top edges of the side walls.

16. A leveling assembly, comprising an elongated, hollow casing formed by two opposing side walls made of nonmagnetic material, and a long flat bottom wall formed of magnetic material, one end of each wall having a cut-away portion defining a recess with said bottom wall, a level structure disposed in said recess, said structure including a pair of flat rectangular plates made of magnetic material partially abutting the ends of said walls, a flat permanent magnet disposed between said flat plates and spaced from edges thereof so that the flat plates serve as pole pieces, said structure being removably held on said flat bottom wall by magnetic attraction of said magnet, each of said plates having an inverted T-shaped cutout at one edge defining a long bottom edge and a pair of overhanging opposed inverted L-shaped tabs, a tubular spirit level engaged in the cutouts of the plates between the tabs and the long edges of the cutouts, each of said plates having another edge perpendicular to said one edge formed with another inverted T-shaped cutout to define a long lateral edge and overhanging other opposed inverted L-shaped tabs, another tubular spirit level engaged in the other cutouts of the plates between said other tabs and the lateral edges thereof, said side walls having aligned holes therein, another spirit level rotatably disposed in the aligned holes, said casing having a top wall with a cut-away portion including further inverted T-shaped cutouts formed in the side walls, said cutouts having opposing top edges and overhanging further tabs, another spirit level adjustably disposed between said further tabs and said top edges of the side walls, each of said levels having a hollow longitudinally arcuate body with resilient ends adjustably engaged by the tabs and bottom edges of the cutouts, and a fluid incompletely filling said body to provide an air bubble movable in said body.

17. The leveling assembly as defined in claim 13, characterized by extensions on the side walls of the casing with opposed grooves in the inner surfaces thereof, and rivets extending through the rectangular plates and magnet of the level structure for fastening the same, the ends of the rivets protruding outwardly of the rectangular plates and adapted to ride in the grooves in the extensions of the side walls for guiding the attaching and detaching movements of the level structure.

References Cited by the Examiner
UNITED STATES PATENTS

| | | | |
|---|---|---|---|
| 1,526,255 | 2/1925 | Taylor | 33—207 |
| 2,105,054 | 1/1938 | Posthuma | 33—75 |
| 2,317,715 | 4/1943 | Ball | 33—214 |
| 3,106,024 | 10/1963 | Lea | 33—207 |

FOREIGN PATENTS

| | | |
|---|---|---|
| 727,438 | 3/1955 | Great Britain. |

ISAAC LISANN, *Primary Examiner*.